United States Patent [19]

Yallon

[11] Patent Number: 5,073,839

[45] Date of Patent: Dec. 17, 1991

[54] DUAL AC FUSE, A FUSE HOLDER AND A METHOD FOR: SIMULTANEOUS SELECTION OF FUSING ELEMENT AND LINE VOLTAGE

[76] Inventor: H. C. Yallon, 13432 Whispering Hills Dr., Dallas, Tex. 75243

[21] Appl. No.: 385,390

[22] Filed: Jul. 27, 1989

[51] Int. Cl.[5] .................... H02H 5/04

[52] U.S. Cl. .................... 361/104; 337/256; 337/290; 337/229; 361/58

[58] Field of Search .................... 361/58, 88, 91, 104, 361/103; 307/28, 29; 337/290, 256, 229, 31, 189

[56] References Cited

U.S. PATENT DOCUMENTS

| | | | |
|---|---|---|---|
| 2,075,516 | 3/1937 | Freeman et al. | 337/256 |
| 2,383,484 | 8/1945 | Holmes | 337/256 |
| 2,838,634 | 6/1958 | Kesselring et al. | 337/31 |
| 3,257,525 | 6/1966 | Gallagher et al. | 337/256 |
| 4,184,137 | 1/1980 | Gaia et al. | 337/229 X |
| 4,734,670 | 3/1988 | Westrom et al. | 337/290 X |

*Primary Examiner*—Todd E. Deboer

[57] ABSTRACT

The proposed invention provides a single fusing device for both 115VAC and 230VAC line voltages, a panel mounted fuse holder and a method for simultaneously selecting the proper fusing element and line voltage.

This invention consists of a dual element AC fuse were the proper fusing element is selected simultaneuously with the required line voltage by a Double Pole Double Throw (DPDT) switch as shown in FIG. 3.

The invention offers a distinct advantage to all manufacturers of electrical/electronics consumer products, systems and instrumentation both in the U.S. and abroad.

1 Claim, 5 Drawing Sheets

DUAL AC FUSE, A FUSE HOLDER AND A METHOD FOR: SIMULTANEOUS SELECTION OF FUSING ELEMENT AND LINE VOLTAGE

BACKGROUND

The familiar fuse, which is a common household item, was invented in the 19th century and has been used the home and industry.

The standard fuse as we know it is a single filament device designed to carry a certain current when a certain voltage is applied between its ends.

When the rated current is exceeded by a specified percentage the fusing link opens and therby disconnecting the current flow providing protection to sensitive systems.

I have noticed, however, that the single element fuse does not provide adequate flexibility for equipment which is intended to operate on a dual switchable line voltage such as 115VAC/230VAC. A great many electrical/electronic systems, instrumentation and consumer products are designed with the feature of selecting line voltage by means of a switch so that equipment manufactured in the U.S. can be operated abroad and vice versa.

The fusing aspect, at the present time, is handled by sending special kits, instructions and a warning to make sure to install the proper fuse prior to applying the line voltage. Errors or oversight often leads to costly repairs and delays in equipment usage.

The above has lead me to the idea of the Dual Link AC Fuse, were the proper fuse link is selected simultaneously with the line voltage as shown in FIG. 3.

This provides complete flexibility and eliminates the need for special kits and instructions.

OBJECTIVE OF THE INVENTION

The main purpose of this invention is to provide a simple, safe method of fusing equipment and systems intended to operate on a dual AC line voltage.

The invention eliminates the need for extra fuse kits and special instructions for fuse replacement.

This invention prevents the possibility of inadvertent damage to equipment due to wrong fusing.

The invention provides for universal use of electrical/electronic equipment were the line voltage and proper fuse are selected simultaneously by the flip of a single switch.

DESCRIPTION OF THE INVENTION

This invention consists of a dual AC fuse, an AC fuse holder and a method for simultaneously selecting the fusing element and the line voltage.

The fuse and fuse holder may take up different forms depending on the application. Three common forms are: panel mount, printed circuit board mount and chassis mount.

The panel mount fuse and holder will be described here.

DESCRIPTION OF DRAWINGS

FIGS. 1A-1E show 5 views of the dual AC fuse. The front view 1 shows the fuse body. The body is made of glass and is ¼" to ½" in diameter and 1.25" to 2" in length. These are typical dimensions, other dimensions are possible depending upon the application. The glass tubular body is terminated in two metallic end caps.

Figure 1A:
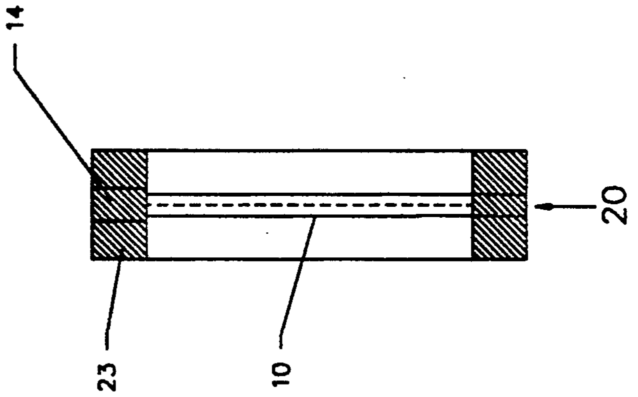
FIGS. 1A-1E show 5 views of the dual AC fuse.
Figure 1E:
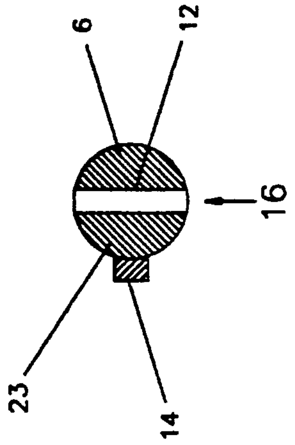
Figure 1D:
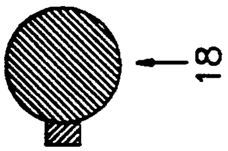
Figure 1B:
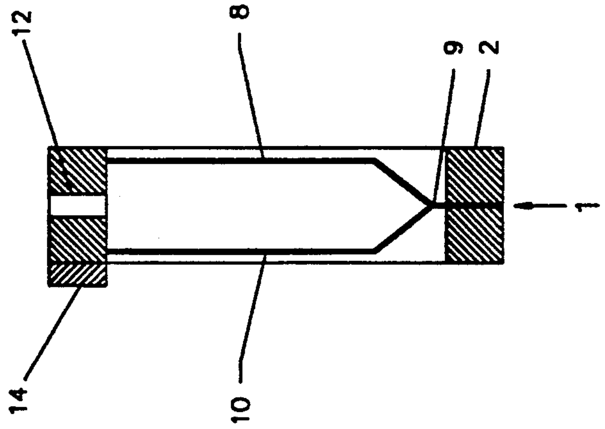
Figure 1C:
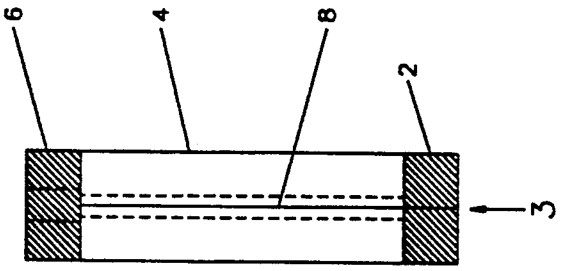

The bottom cap 18 is made of a metallic substance and is bonded to the glass tubing by epoxy.

The top cap 16 has two metallic parts 6 and 23 separated by an insulating strip 12 made of plastic or ceramic. This insulating strip provides the proper isolation between the two fuse elements.

Two fusing elements are shown enclosed within the glass body. On the left is the 115VAC element 10. this is a metallic, electricity conducting element. Note that this element is wider or thicker than the adjacent 230VAC element 8 since it always carries twice the current compared to element 8.

On the right is the 230VAC element 8, it too is a metallic, electricity conducting element. As described above this element is half as wide or thick as element 10.

Note that the width, thickness or shape of the elements is determined by the current rating, however the relative relation between the two is maintained.

Also note that the two elements do not need to be welded together at the common point 9, each element could be separately welded to the bottom cap.

The right side view 1C is intended primarily to show the 230VAC element 8 so that when compared to the left side view 20 the size difference could be viewed.

The left side view 20 is intended to show the 115VAC element 10.

Figure 2A:
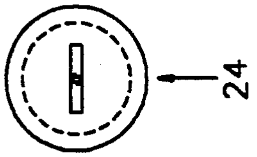
FIGS. 2, 2A-2C show views of a panel mount fuse holder and a single view of the fuse holder cap. As indicated above this is one possible version, many others are possible depending upon the application.
Figure 2B:
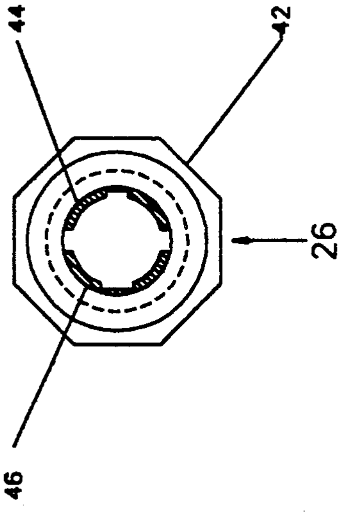
Figure 2C:
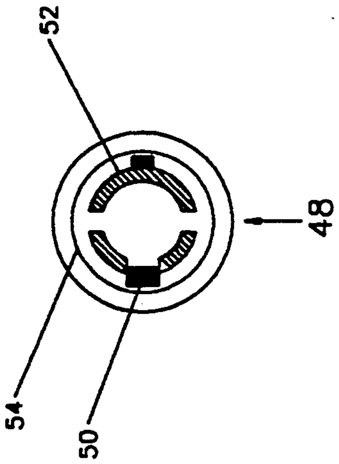
Figure 2:
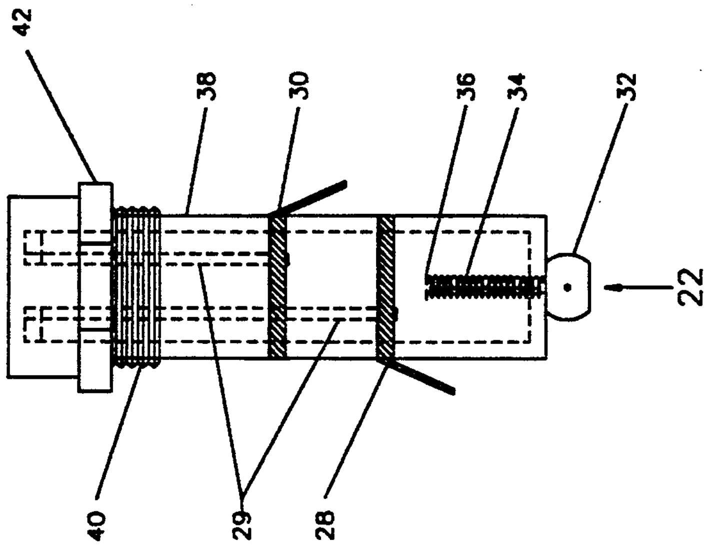

This view 20 as well as the top view 16 also show the orientation key 14, which is a rectangular protrusion designed to orient the fuse in the fuse holder cap shown in FIG. 2 labeled as "fuse holder cap" 48.

FIG. 2 shows one commonly used fuse holder, the panel mount type. As previously mentioned other variations are possible, such as chassis mount, printed circuit board mount and others. The fuse holder consists of two parts: the main body 22 and the cap 48.

The main body of the holder 22 is made of plastic. The treaded section 40 and the securing nut 42 are used to mount the holder to a panel.

On the outer surface of the holder there are 2 metallic rings 28 and 30 to which wires are soldered. The other end of each wire is soldered to switch 68 shown in FIG. 3.

The two solder contact rings 28 and 30 also make contact via solder joints with 2 internal metallic rods 29 thereby completing the electrical path when the fuse in inserted in the cap and the cap and fuse are inserted in the main fuse body and the cap is tightened by an ⅛ of a turn.

The common contact of the fuse 22 consists of a pin and a spring 34.

When the fuse is inserted in the holder the common end of the fuse depresses the pressure pin 36 and thereby provides good electrical contact for the fuse.

Figure 3:
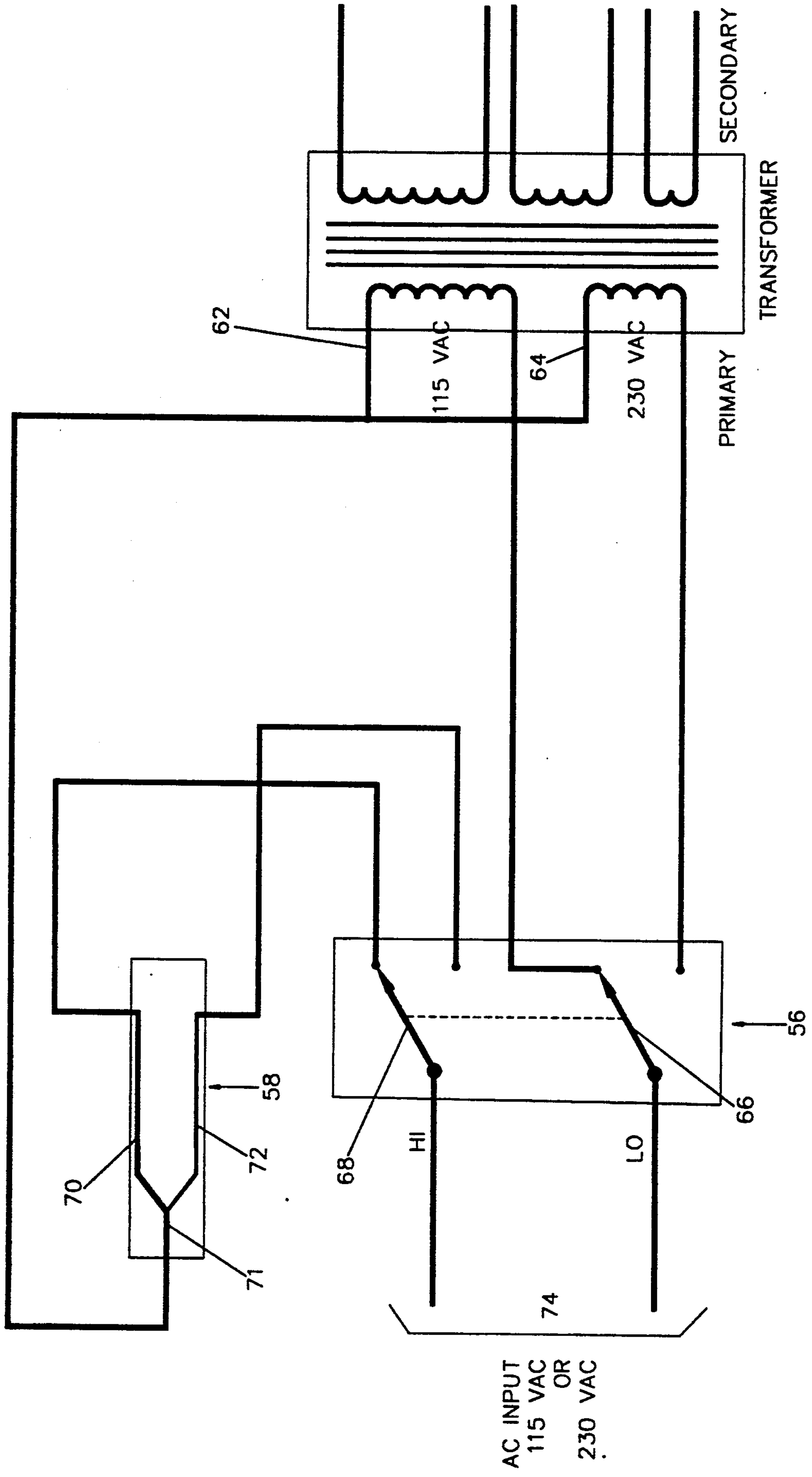
FIG. 3 is an electrical schematic showing the electrical interconnection and switching arrangement for the simultaneous selection of the proper fuse and the line voltage.

An electrical wire is soldered to the fuse common contact 32 the other end of this wire is soldered to the transformer primaries 62 and 64 as shown in FIG. 3.

The top view of the fuse holder 26 shows the two metallic contacts 44 and 46 which also act as orientation keys for the fuse and fuse cap.

The fuse holder cap 48 consists of a plastic body 54 and two inserted metallic contacts 50 and 52.

The fuse is inserted into the fuse cap 48 using the orientation key for proper alignment. Now the fuse is inserted in the holder using the cap as a launcher. A slight pressure inward and ⅛ turn clockwise locks the cap in position and completes the required electrical continuities.

FIG. 3 is an electrical schematic showing one possible way of interconnecting a DPDT switch, the dual AC fuse and a dual primary transformer to accomplish simultaneous AC line and fuse selection.

The electrical schematic shows 3 major components and interconnections.

The major components are: a Double Pole Double Trow (DPDT) switch 56, the dual AC fuse 58 and a dual primary transformer 60. The schematic shows the interconnection for 115VAC operation. The AC line inputs High and Low are connected to the common of switches 68 and 66 respectively.

Switch 68 selects the required elements either the 115VAC element or the 230VAC element. The common point of the fuse elements 71 is connected to each of the primaries 62 and 64.

Switch 66 selects the proper AC return. Both switches 66 and 68 are configured as a Double Pole Double Trow switch and hence are switched simultaneously thus selecting line voltage and proper fuse.

The above description shall not be construed as limiting the ways in which this invention may be practiced but shall be inclusive of many other variations that do not depart from the broad interest and intent of the invention.

I claim:

1. A dual element AC fuse intended for the protection of equipment and systems intended to operate on 115VAC or 250VAC line voltage, the fuse is composed of the following:

(a) a tubular glass body;

(b) two end caps that are epoxied to the tube ending;

(c) a top cap consisting of two metallic sections separated by an insulating strip;

(d) a bottom cap consisting of a metallic substance;

(e) two metallic elements enclosed within the glass body and whose size and shape are function of the fuse rating.

* * * * *